US009553459B2

(12) United States Patent
Mack

(10) Patent No.: US 9,553,459 B2
(45) Date of Patent: Jan. 24, 2017

(54) SUPPLY SYSTEM AND METHOD FOR SUPPLYING AN ELECTRIC LOAD

(75) Inventor: Juergen Mack, Goeppingen (DE)

(73) Assignee: Robert Bosch GmbH, Stuttgart (DE)

( * ) Notice: Subject to any disclaimer, the term of this patent is extended or adjusted under 35 U.S.C. 154(b) by 486 days.

(21) Appl. No.: 14/130,206

(22) PCT Filed: May 25, 2012

(86) PCT No.: PCT/EP2012/059858
§ 371 (c)(1),
(2), (4) Date: Apr. 3, 2014

(87) PCT Pub. No.: WO2013/000644
PCT Pub. Date: Jan. 3, 2013

(65) Prior Publication Data
US 2014/0217957 A1    Aug. 7, 2014

(30) Foreign Application Priority Data

Jun. 30, 2011   (DE) .................. 10 2011 078 386

(51) Int. Cl.
*H02J 7/00*        (2006.01)
*H02J 7/02*        (2016.01)
(Continued)

(52) U.S. Cl.
CPC ............ *H02J 7/0004* (2013.01); *G08C 19/00* (2013.01); *G08C 23/04* (2013.01); *H02J 7/0045* (2013.01);
(Continued)

(58) Field of Classification Search
CPC ........ H02J 7/0004; H02J 7/025; H02J 7/0045; H02J 2007/0096; H02J 2007/0098; G08C 19/00; G08C 23/04; H01M 2010/4278; H01M 10/482
See application file for complete search history.

(56) References Cited

U.S. PATENT DOCUMENTS 5,206,097 A    4/1993 Burns et al.
5,536,979 A    7/1996 McEachern et al.
(Continued)

FOREIGN PATENT DOCUMENTS

DE    297 24 016    10/1999
DE    199 55 985    5/2001
(Continued)

*Primary Examiner* — Nha Nguyen
(74) *Attorney, Agent, or Firm* — Norton Rose Fulbright US LLP; Gerard Messina

(57) ABSTRACT

A system for supplying an electric load, in particular for charging a battery device, including a charging station with an accommodation unit for the battery device and a detection unit for the battery device. The detection unit includes a first optical transmitting device for transmitting a first optical signal and an optical receiving device for receiving the first optical signal. The battery device includes a second optical transmitting device for transmitting a second and third optical signal, the second optical transmitting device functioning as a transmitter of a discretely configured optocoupler for transmitting information from the battery device to the charging station. The optical receiving device of the charging station is configured as a receiver of the discretely configured optocoupler for receiving the second and third optical signals.

12 Claims, 4 Drawing Sheets

(51) Int. Cl.
*G08C 23/04* (2006.01)
*G08C 19/00* (2006.01)
*H01M 10/48* (2006.01)
*H01M 10/42* (2006.01)

(52) U.S. Cl.
CPC ............. *H02J 7/025* (2013.01); *H01M 10/482* (2013.01); *H01M 2010/4278* (2013.01); *H02J 2007/0096* (2013.01); *H02J 2007/0098* (2013.01)

(56) References Cited

U.S. PATENT DOCUMENTS

| | | | | |
|---|---|---|---|---|
| 5,734,254 | A | * | 3/1998 | Stephens ................. H02J 7/025 320/106 |
| 6,265,844 | B1 | | 7/2001 | Wakefield |
| 6,331,763 | B1 | * | 12/2001 | Thomas ................. H02H 9/042 320/136 |
| 2006/0087286 | A1 | | 4/2006 | Phillips et al. |

FOREIGN PATENT DOCUMENTS

| | | |
|---|---|---|
| EP | 0 985 573 | 3/2000 |
| WO | 98/01917 | 1/1998 |
| WO | 2010/033517 | 3/2010 |

\* cited by examiner

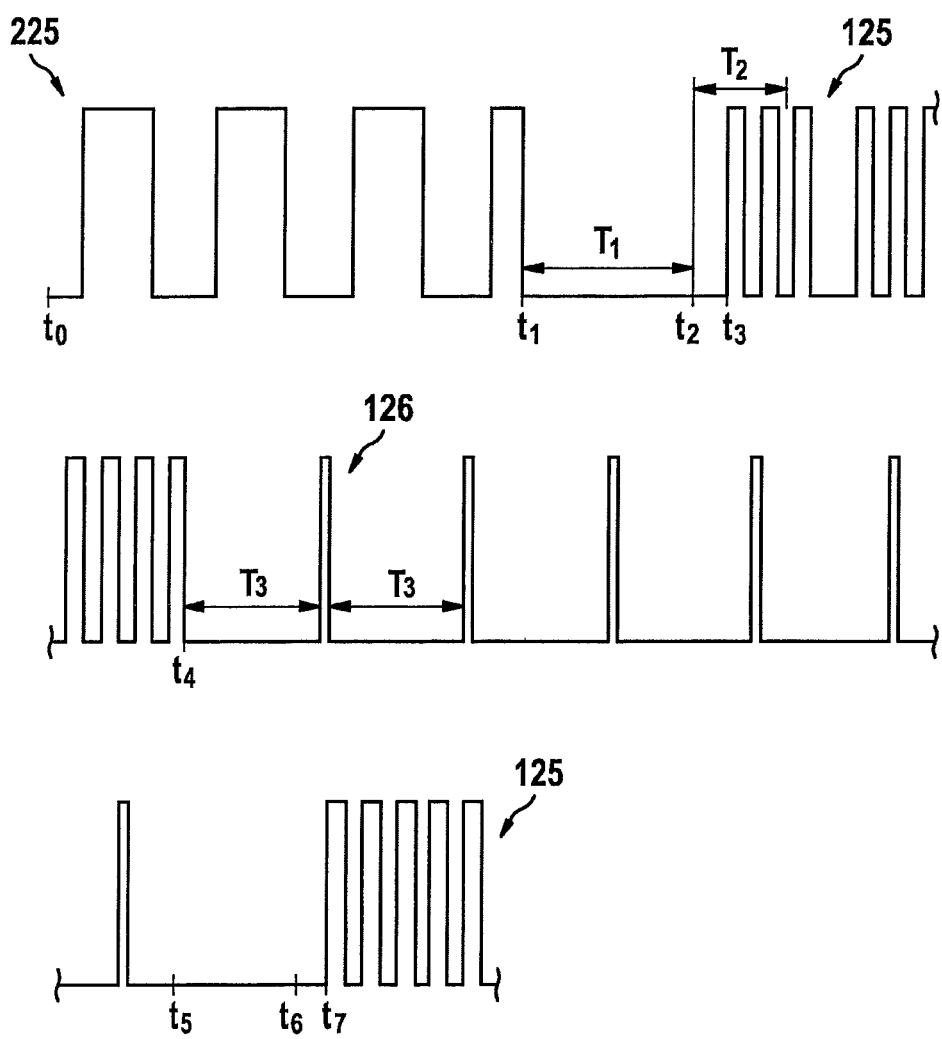

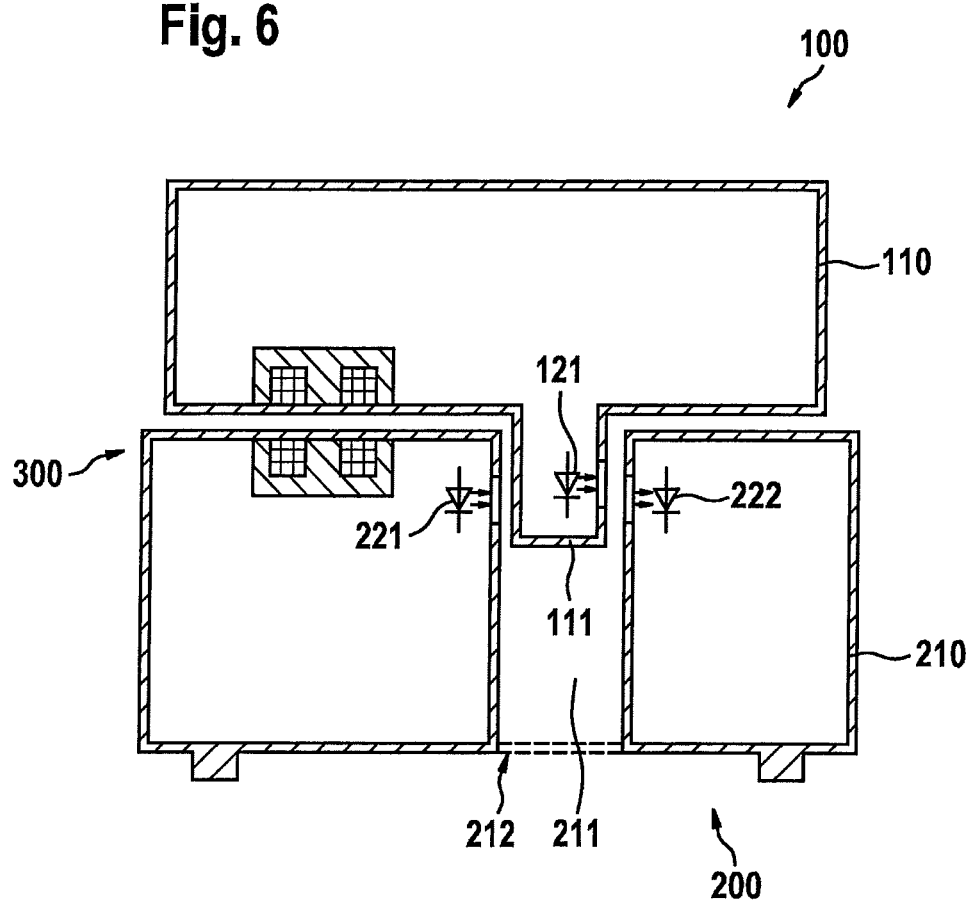

SUPPLY SYSTEM AND METHOD FOR SUPPLYING AN ELECTRIC LOAD

FIELD OF THE INVENTION

The present invention relates to a system for supplying an electric load, in particular for inductively charging a battery device, such as a rechargeable battery pack or an electrical device having integrated battery cells, with the aid of a charging station. The charging station includes a light barrier having a light source and an electrooptic receiving device which forms the receiver of a discretely configured optocoupler for closing the control circuit of the charging system when the battery device is inserted.

BACKGROUND INFORMATION

Battery devices, such as rechargeable batteries, battery packs or terminal equipment having permanently installed chargeable battery cells are typically charged with the aid of external charging stations. This includes inter alia utilizing charging methods which use a contactless energy transmission between the charging station and the battery device. In an inductive charging system, for example, energy may be transmitted with the aid of a magnetic field. For this purpose, a transmitter coil housed in a charging station generates an alternating magnetic field which induces an electrical alternating current in a corresponding receiver coil of the battery device. However, an inductive coupling between both devices is required in order for the energy to be effectively delivered from the charging station to the accommodation unit. Thus, the transmitter and the receiver coil, depending on the quality of the inductive coupling, must typically be situated at a relatively small distance of a few millimeters to several centimeters from one another, the inductive coupling capable of being enhanced by a ferromagnetic core in the transmitter and the receiver coil.

In a wireless charging system which operates on the basis of an inductive energy transmission, different problems may arise depending on the configuration. Thus, for example, sufficient detection of a battery pack inserted into the charging station must be ensured, which requires a cyclical "pinging" of the battery device when the charging station is in standby mode. Furthermore, an adequate communication path between the battery pack and the charging station is also necessary in order to be able to determine the point in time when charging or recharging is ended and to communicate the required energy needs. In addition, foreign objects must be clearly and easily detected. Furthermore, a sufficiently robust feedback system for closing the control circuit must also be provided.

Various approaches are already known which provide optical transmission systems for charging systems. The publication DE 29724016 U1, for example, discusses a charging device for a rechargeable battery in which a detection of rechargeable batteries having varying capacitances is implemented with the aid of light barriers. In addition, the charging device includes an IR interface for transmitting information from the rechargeable battery to the charging device.

A charging device for inductively charging a hand-held power tool is discussed in U.S. Pat. No. 5,536,979 A, in which the hand-held power tool communicates the fully charged state of its internal battery cells to the charging device with the aid of a photodiode.

A charging device for charging rechargeable batteries is also discussed in DE 19955985 A1 U1, the charging device including a light barrier for detecting an inserted rechargeable battery.

A rechargeable battery pack having a coding pin for interrupting a light barrier situated in the charging device is also discussed in DE 202009002787 U1.

SUMMARY OF THE INVENTION

An object of the present invention therefore is to reduce the power consumption when supplying an electric load, in particular in a charging station for inductively charging a battery device. The object is achieved by a system as described herein. The object is further achieved by a method as described herein, a supply station as described herein and a method as described herein. Additional advantageous specific embodiments are indicated in the further descriptions herein.

According to the present invention, a system is provided for supplying an electric load, in particular a system for charging a battery device, which includes a charging station having an accommodation unit for the battery device and a detection unit for the battery device, the detection unit including a first optical transmitting device for transmitting a first optical signal and an optical receiving device for receiving the first optical signal. In this configuration, the battery device includes a second optical transmitting device for transmitting a second and third optical signal, the second optical transmitting device functioning as a transmitter of a discretely configured optocoupler for transmitting information from the battery device to the charging station. The optical receiving device of the charging station is configured as a receiver of the discretely configured optocoupler for receiving the second and the third optical signal. The optocoupler allows for a robust communication link between the battery device and the charging station which is secure against electromagnetic interferences, and which makes possible an optimal feedback of required energy needs. The combination of detection and communication functions, the optical receiving device being used both for detecting the battery device as well as for communicating between the battery device and the charging station, allows for a savings on components, which is reflected inter alia in a simplified manufacture and reduced manufacturing costs.

In one specific embodiment it is provided that the battery device includes a housing having a conical housing part, which, upon insertion of the battery device, is introduced between the first optical transmitting device and the optical receiving device of the charging station and, in the process, interrupts the first optical signal. In the process, the second optical transmitting device is housed in the conical housing part in such a way that when the battery device is inserted, it is situated in the field of view of the optical receiving device. The arrangement of the second optical transmitting device in the conical housing part allows for a particularly simple arrangement of the optical devices. Here, the conical housing part is used both to shield the first optical transmitting device and to position the second optical transmitting device in the field of view of the optical receiving device.

One further specific embodiment provides that the charging station includes a receiving shaft for the conical housing part of the battery device, in which the optical transmitting device and the optical receiving device of the charging station are situated opposite one another. The receiving shaft allows for secure placement of the optical transmitting and receiving devices. In addition, it is also possible to individually configure or arrange the receiving shaft for a battery device, thereby ensuring that only a battery device provided for the former may be charged with the charging station. This avoids any potential operating errors.

In one further specific embodiment it is provided that the receiving shaft is configured as a continuous opening within the housing of the charging station. This configuration enables foreign objects and dirt particles which enter into the receiving shaft to fall completely through the continuous opening, not allowing them to accumulate within the receiving shaft. Functional disruptions of the optical devices are effectively prevented in this way.

According to one further specific embodiment, it is provided that the charging station includes an inductive transmitter coil for transmitting energy in the form of an alternating magnetic field to an inductive receiver coil of the battery device. In this configuration, the charging station is configured to initiate the transmission of energy if over a predefined first time span the receipt of the first optical signal is interrupted. The charging station is further configured to stop the transmission of energy if over a predefined second time span no second optical signal is received and/or if the third optical signal is received. Transmitting energy immediately after the interruption of the first optical signal caused by the insertion of the battery device may ensure that even a low charged battery receives sufficient energy after being inserted into the charging station, in order to be able to transmit information to the charging station necessary to initiate the actual charging operation. Conversely, the interruption of the energy transmission that automatically occurs if over a predefined second time span the battery device does not transmit a second optical signal to the charging station, allows for the clear detection of foreign objects. Furthermore, the interruption of the energy transmission or the switching of the charging station to standby mode after the third optical signal is received enables the battery device to end the charging operation. In general, a significant reduction in power output in the charging station may be achieved through the interruption of the energy transmission. Discontinuing the energy transmission also prevents the magnetic field from having a disruptive effect on the area surrounding the charging station or from resulting in the undesirable heating of foreign objects.

In one further specific embodiment, it is provided that the battery device is configured to transmit with the aid of an optical pulse transmission protocol via the optical transmitter device to the optical receiver device of the charging station identification-related information, information on the instantaneous state of charge or instantaneous residual capacitance, on any potential malfunction and/or on instantaneous power requirements of the battery device. Such a pulse transmission protocol is robust toward disruptions and, moreover, is relatively simple to implement.

Also provided is a method according to the present invention for supplying an electric load, in particular for inductively charging a battery device, the battery device being inserted into an accommodation unit of the charging station. Here, the insertion of the battery device into the accommodation unit is detected with the aid of a detection unit made up of a first optical transmitting device which transmits a first optical signal and an optical receiving device which receives the first optical signal. In the process, the transmission of energy from an inductive transmitter coil of the charging station to an inductive receiver coil of the battery device is initiated if the transmission of the first optical signal is interrupted over a predefined first time period. The charging operation is also initiated if within the second time span the optical receiving device receives a second optical signal from a second optical transmitting device of the battery device. Finally, the charging operation is stopped if the optical receiving device receives a third optical signal from the second optical transmitting device.

In one further specific embodiment of the method according to the present invention, the energy transmission is stopped again if after expiration of the second time span the optical receiving device does not receive a second optical signal from a second optical transmitting device of the battery device. In this way, an effective fault detection may be implemented in a relatively simple manner, which automatically stops the transmission of energy in the case of a defective battery device or if a foreign object is inserted.

One further specific embodiment provides that the charging operation is stopped if after removal of the battery device the optical receiving device again receives the first optical signal. Thus, an automatic switch to standby mode is implemented in a very simple manner upon removal of the battery device.

Finally, one further specific embodiment provides that the charging operation is restarted if, when the battery device is inserted, the transmission of the third optical signal from the second optical transmitting device to the optical receiving device is interrupted over a time span which corresponds to at least the first time span. In this implementation, no energy is drawn from the battery cells of the battery device when a renewed energy transmission is required. Thus, with the aid of this method a battery device may be recharged again, even when the battery cells of the battery device show a critical state of charge.

The present invention is explained in greater detail below with reference to the drawings.

BRIEF DESCRIPTION OF THE DRAWINGS

FIG. 5 shows the signal sequence at the optical receiving device of the charging station in various operating situations for illustrating the method according to the present invention.

FIG. 6 shows an alternative specific embodiment of the charging station having a receiving shaft configured as a continuous opening.

DETAILED DESCRIPTION

The present invention is explained below using as an example the electrical supply of a battery device. However, the present invention may be used in conjunction with any type of electric consumer, in particular in conjunction with electrical devices such as, for example, household appliances, power tools or lamps.

Figure 1:
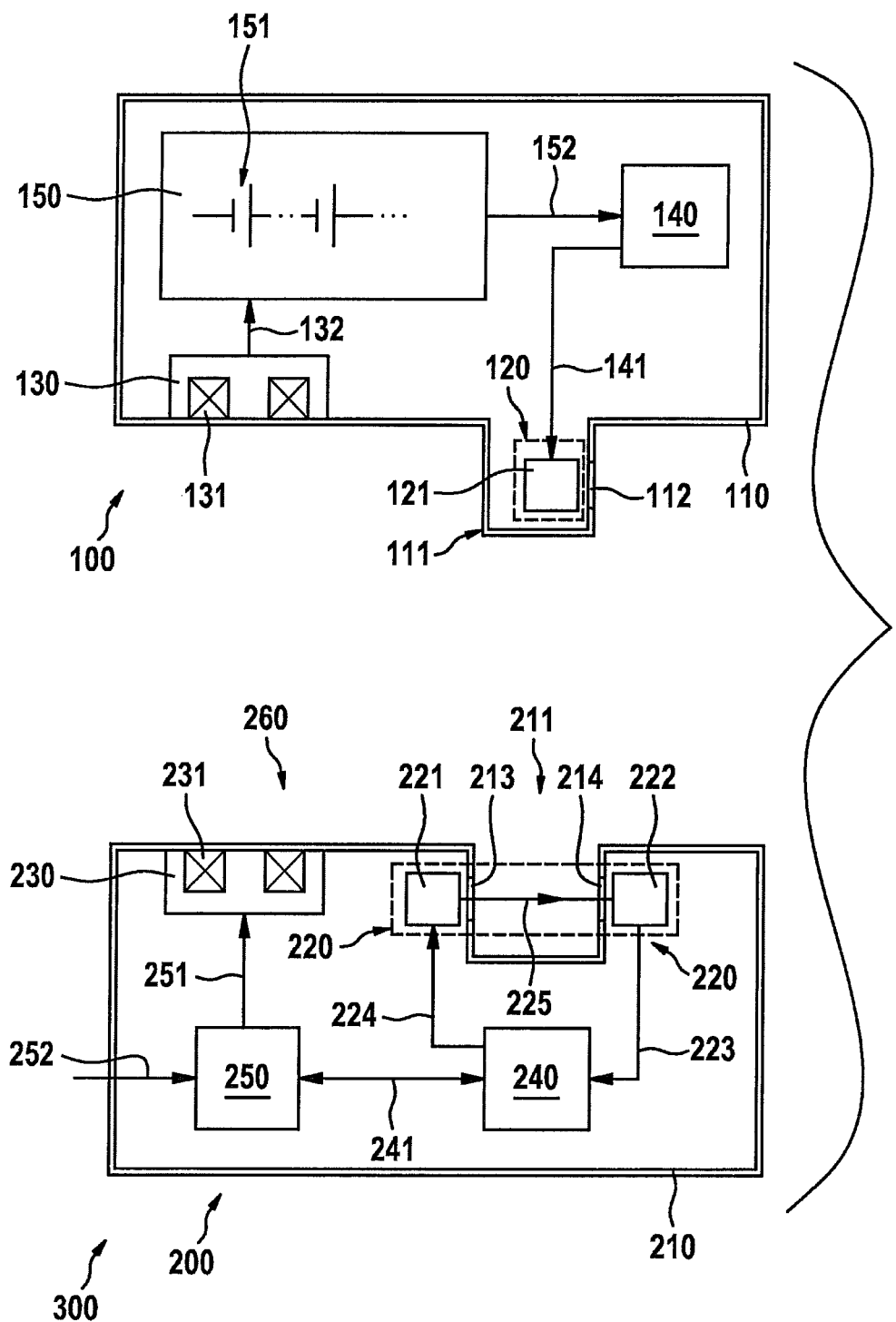
FIG. 1 shows a schematic representation of the system according to the present invention having a battery device and a charging station for inductively charging the battery device.

FIG. 1 shows a system 300 for charging a battery device 100 with the aid of a charging station 200. The battery device 100 is, for example, a so-called battery pack or storage battery pack or an electrical device having integrated battery cells. Battery device 100 includes an energy storage unit 150 which has one or more rechargeable battery cells or storage battery cells 151. To charge the energy storage unit 150, battery device 100 includes an electrical interface 130 which in the present case is configured as an inductive interface having an inductive receiver coil 131. Energy received by electrical interface 130 is supplied to energy storage unit 51 via a first connecting line 132. To control the charging operation, battery device 100 further includes a control unit 140 which retrieves certain parameters of battery cells 151 from energy storage unit 150 via connecting line 152. Control unit 140 is connected via a third line 141 to a communication unit 120 of battery device 100, which includes an optical transmitting device 121. Optical transmitting device 121 of battery device 100, configured for example as a light emitting diode (LED), is the one housed within a conical housing part 111 of housing 110. Conical housing part 111 has a transparent window area 112, optical transmitting device 121 being oriented in such a way that the light emitted from it is emitted through transparent window area 112.

Charging station 200 has an accommodation unit 260 for battery device 100 which in the present case is configured as a support surface for battery device 100. In the area of accommodation unit 260, housing 210 includes a receiving shaft 211 for receiving conical housing part 111 of battery device 100. This housing part 211 may be configured as a pocket hole, as is the case in the present example, or alternatively also as a continuous opening.

Provided on two opposite side walls of receiving shaft 211 are window areas 213, 214 which in the present example are configured as cut-outs in housing 210 of charging station 200. Alternatively, window areas 213, 214 may also be formed by a transparent housing part.

In order to detect whether a battery device 100 is situated in accommodation unit 260 of charging station 200, charging station 200 includes an optical detection unit 220 for battery device 100. Functioning as detection unit 220 is a light barrier formed from an optical transmitting device 221, for example, an LED, and from an optical receiving device 222, for example, a photodiode. The two optical devices 221, 222 may be situated on two opposing side walls of receiving shaft 211. Two window areas 213, 214 situated within the housing wall, which may be configured as recesses in the housing or as transparent housing cut-outs, allow the transmission of an optical signal 225 from optical transmitting device 221 to optical receiving device 222. The two optical devices 221, 222 are connected via corresponding connecting lines 243, 224 to an internal control unit 240 of charging station 200. A specific logic circuit (not shown here) of internal control unit 240 evaluates the information received from optical receiving device 222 in the form of light pulses and controls the various functions of charging station 200 on the basis of this information. Thus, for example, to detect battery device 100, optical transmitting device 221 is activated in such a way that it transmits a particular optical signal, which may be a particular standby pulse pattern, to optical receiving device 222. Control unit 240 also activates power electronics 250 via connecting line 241 which, in turn, provides the electric current for inductive transmitter coil 231 to electrical interface 230 of charging station 200. In addition, power electronics 250 is also connected via a mains connection 252 to an external electricity grid or voltage grid.

Figure 2:
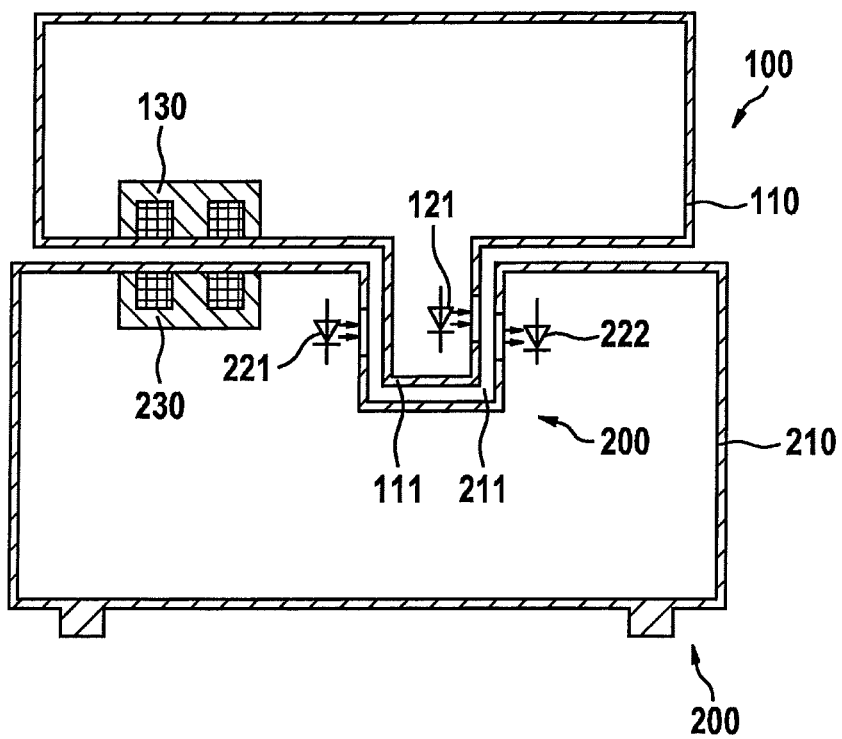
FIG. 2 shows the system from FIG. 1, the battery device being inserted for charging into an accommodation unit of the charging station.

To charge battery cells 151, battery device 100 is inserted in an intended manner into accommodation unit 260 of charging station 200. In so doing, conical housing part 111 of battery device 100 is introduced into receiving shaft 211. Conical housing part 111 in its end position interrupts the optical transmission path of the light barrier formed by optical transmitting device 121 and optical receiving device 222, which signals to control unit 240 of the charging station the presence of battery device 100 in accommodation unit 260. At the same time, by introducing conical housing part 111 into receiving shaft 211, an optical connection is formed between optical transmitting device 121 of the battery device, functioning as the transmitter of optocoupler 310, and optical receiving device 222 of the charging station, functioning as receiver 312 of optocoupler 310. FIG. 2 shows the system from FIG. 1 as battery device 100 is inserted into accommodation unit 260 of charging station 200. For reasons of clarity, the illustration of the further electrical components of battery device 100 and charging station 200 has been omitted in FIG. 2.

Figure 3:
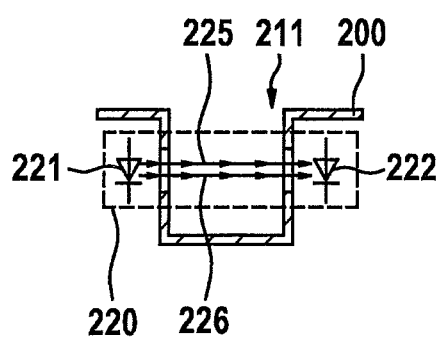
FIG. 3 shows a receiving shaft formed in the housing of the charging station having an optical detection unit for the battery device.
Figure 4:
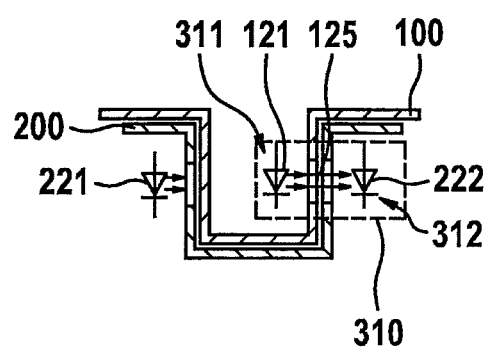
FIG. 4 shows a conical housing part of the battery device during the charging operation introduced within the receiving shaft.

FIGS. 3 and 4 show the different functionalities of the optical devices in various operating states of charging system 300. In each case schematic detailed views are shown of the shaft of housing part 211 of the charging station. FIG. 3 shows receiving shaft 211 with battery device 100 removed. In this standby operating mode optical transmitting device 221 transmits cyclically or periodically a predefined standby light signal such as, for example, a specific pulse pattern. Since the optical transmission path of light barrier 220 is not interrupted, optical receiving device 222 is able to uninterruptedly receive the optical signal transmitted from optical transmitting device 221. The received signal is evaluated by a logic circuit which, for example, is contained within control unit 240, and based on the detected standby signal charging station 200 is switched into standby mode. In the process, control unit 240 transmits a corresponding control signal to power electronics 250 which, in turn, interrupts the current supply of transmitter coil 231. If charging station 200 is already in the standby operating mode, this mode is further maintained.

If battery device 100 is inserted into the accommodation unit of charging station 200, conical housing part 111 introduced into receiving shaft 211 of the charging station then moves in front of optical transmitting device 221 and interrupts thereby the optical transmission path of light barrier 220. As shown in FIG. 4, optical receiving device 222 of the charging station and optical transmitting device 121 of the battery device together form in this operating situation discretely configured optocoupler 310 for transmitting information between the battery device and the charging device. In this case, optical transmitting device 121 functioning as the transmitter of the optocoupler transmits information of control unit 140 of battery device 100 in the form of certain light pulse patterns to optical receiving device 222, which functions as transmitter 312 of optocoupler 310.

The functioning of the charging system according to the present invention is explained in greater detail below:

When battery device 100 is removed, optical receiving device 222 receives from optical transmitting device 221 of the charging device a specific standby pulse pattern which is evaluated by a logic circuit of control unit 240. Based on the received standby signal, control unit 240 recognizes that no battery is inserted and activates power electronics 250 of the charging station in such a way that electrical interface 230 of charging station 100 is deactivated, and current to inductive transmitter coil 231 is switched off. As a result, transmitter coil 231 in standby mode generates no disruptive magnetic field which under certain circumstances could result in disruptions in the electrical system or in the heating of foreign objects.

By inserting battery device 100 into charging station 200, an optical transmission path is created between optical transmitting device 121 of battery device 100 and optical receiving device 222 of charging station 200. As shown in FIG. 3, optical transmitting device 121 and optical receiving device 222 in this operating state form a discretely configured optocoupler.

Transmitting device 221 is cyclically or periodically acted upon by a predefined standby pulse pattern which is detected by receiving device 222 when battery device 100 is removed. The received pulse pattern is evaluated by an external logic of the internal control unit 240 of the charging station and the charging station is subsequently switched to standby mode or continues to be in standby mode. In addition, control unit 240 activates power electronics 250 of the charging station in such a way that the current supply for electrical interface 230 or for inductive transmitter coil 231 is always switched off in this operating mode. Since the transmitter coil no longer generates a magnetic field in the activated standby mode, this measure results in a significant reduction in power consumption of the charging station in standby mode.

If battery device 100, as shown in FIG. 3, is placed on charging station 200, the incidence of light of optical transmitting device 221 is shaded by conical housing part 111, and the optical transmission path of the light barrier is interrupted. In this case, control unit 240 of the charging station detects an interruption of the standby pulse pattern cyclically transmitted by optical transmitting device 221. As a consequence, charging station 200 switches from standby mode to a normal operating mode and initiates the transmission of power via electrical interface 230, which occurs as a result of corresponding activation of power electronics 250 by control unit 240. If after a predefined time span no signal is received via the optical interface, the charging station then once again returns to standby mode.

During a charging operation or an energy transmission, the manipulated variable for the energy required or demanded by the battery device is transmitted using an optical pulse transmission protocol. Such a protocol may be formed, for example, with the aid of a variation of the duty factor as is, for example, the case with pulse-width modulation, or by variation of the pulse rate or frequency of the individual pulses. Here, the optical transmission path represents a feedback of the control system. Thus, the manipulated variable is transmitted optically via the discretely configured optocoupler 300 made up of optical transmitting device 121 situated in conical housing part 111 and optical receiving device 222. The manipulated variable itself modulates in a suitable manner the power electronic activation of the transmitter coil, in order to transmit the required energy via electrical interface 130, 230 of the charging system.

To save more energy, charging device 200 in normal charge mode switches automatically to standby mode if no pulse pattern is sighted within a predefined time span. Such a function may be implemented within control unit 240 in the form of a so-called "missing pulse detector," which analyzes the pauses between the individual pulses and becomes active if a pause between two pulses exceeds the predefined time span T1. Such a function may in principle also be used for detecting fault states. If over a predefined period of time the missing pulse detector fails to register any incoming light pulses, a fault in the charging system may also be deduced. Thus, with the automatic switch to standby mode, the power is immediately reduced or the energy transmission stopped in the event of any faults on the side of the battery pack or device.

If battery cells 151 of battery device 100 are completely charged or no additional power is required by terminal device 100, then optical transmitting device 121 of battery device 100 is acted upon by a specific pulse pattern 126, which may be a unique standby pulse pattern. Here, a relatively short pulse is transmitted in each case, followed by a relatively long pause time T3. In this case, the pause time T3 of standby pulse pattern 126 is shorter than the predefined duration T1, with the aid of which internal control unit 240 of charging station 200 detects the insertion of a battery device 100.

Thus, an energy transmission is effectively prevented, which would otherwise be initiated automatically upon expiration of time span T1. The result of the small duty factor having a short pulse duration and a long pause is an energy-efficient transmission mode. Moreover, to effectively avoid an unnecessary discharging and, if applicable, a low charge condition of battery cells 151, the transmission of standby pulse pattern 126 by optical transmitting device 121 is initiated after reaching a predefined upper state of charge SOChigh and is stopped when falling below a predefined low state of charge (SOClow). The resulting hysteresis prevents the cyclical on and off switching of the charging operation which typically occurs near the end of charging (SOC 100%). The instantaneous state of charge of battery cells 151 is relatively easy to ascertain, for example, with the aid of a voltage metering implemented in battery device 100. Thus, an unnecessary discharge as a result of current consumption caused by the transmission of standby pulse pattern 126 is avoided.

If battery device 100 again requires electrical energy, then optical transmitting device 121 of the battery device is not acted upon by current for a time span which corresponds at least to time span T1. This results in a situation similar to the insertion of battery device 100 into charging station 200. Over a time span T1 control unit 240 of charging station 200 registers no arriving signals and at that point initiates a renewed energy transmission to battery device 100. Since in this case no energy is required to activate renewed charging, it is therefore possible to also recharge battery devices having low discharged battery cells.

Typical operational sequences or charging operations are discussed in detail below. The optical signals arriving at receiving device 222 are shown in FIG. 5. Depending on the operational situation, such signals are transmitted both by first optical transmitting device 221 of charging station 200 and by second optical transmitting device 121 of battery device 200.

At point in time t0, charging station 200 is switched on or connected to the external electricity grid. Shortly thereafter charging station 200 transitions automatically to standby mode, optical transmitting device 221 beginning the transmission of its typical standby pulse pattern 225. As long as standby pulse pattern 225 is received by optical receiving device 222, internal control unit 240 registers that battery device 100 is not yet mounted in accommodation unit 260 of charging station 200.

At point in time t1, a battery device is inserted into accommodation unit 260 of charging station 200. Since, as is shown in FIG. 3, optical transmitting device 221 is shaded by conical housing part 111 in the process, receipt of the standby pulse pattern transmitted by transmitting device 221 is interrupted. After expiration of a predefined time span T1, charging station 200 at point in time t2 initiates energy transmission and awaits for a time span T2 the response from the battery device. If no feedback from the battery device occurs within this time span T2, energy transmission is immediately discontinued and the charging device is shifted to standby mode. This situation occurs, for example, when battery device 100, optical receiving device 222 or the evaluation circuit are defective. Therefore, a fault may be clearly and safely deduced and thus the safety and reliability of the entire system measurably enhanced. In this case the charging station remains in fault mode, i.e., without energy transmission, until either the charging station is switched off, then back on again, or receiving device 222 again dictates the specific standby pulse pattern of the charging station.

Conversely, if the battery device responds within time span T2, as is the case at point in time t3 in FIG. 5, the charging station switches from standby mode to a charge or energy transmission mode, the energy being transmitted via electrical interfaces 230, 130 from charging station 200 to battery device 100. The energy required for the charging or operation is conveyed to the charging station by way of an optical pulse transmission protocol. If the battery device is not removed beforehand, then a normal full charging operation is carried out up to point in time t4, which represents the end of the charging operation. If battery device 100 remains inserted even after charging is complete up to point in time t4, as is the case in FIG. 5, then the battery device initiates the transmission of a unique standby pulse pattern 126. If the battery device is removed from the charging station before the end of charge is reached at point in time t4, then optical receiving device 222 again receives the specific standby pulse pattern 225 of transmitting device 221 (this situation is not shown here). In both cases, charging station 200 alternates between a charge or energy transmission mode and an energy-saving standby mode.

Thus, after the end of the charging operation, in principle the following situations may arise: If battery device 100 is removed from charging station 200, then charging station 200, similar to the above described removal of the battery device during the charging operation, is switched to standby mode. If battery device 100 remains inserted into charging station 200 even after the end of the charging operation, as is shown in FIG. 5, then charging station 200 remains in standby mode until the state of charge at point in time t5 falls below limiting value SOClow. In this state battery device 100 forces a re-start of the energy transmission at point in time t6 by deliberately stopping the transmission of standby pulse pattern 126. In addition, point in time t6 similarly corresponds to point in time t2, at which time a new charge and energy transmission cycle begins. In the process, the battery device responds at point in time t7 to the start of energy transmission by transmitting a corresponding pulse pattern 125.

FIG. 6 shows an alternative configuration of receiving shaft 211 in the form of a continuous opening extending essentially perpendicularly within housing 210 of charging station 200. The higher resistance of optical transmission system 121, 221, 220 to contamination is achieved in this manner, since foreign bodies and dirt particles, which may enter into receiving shaft 211 and are basically suited for impeding the function of the optical devices of charging system 300, are able to exit receiving shaft 211 again through opening 212 in the lower part of housing 210.

Although the inventive concept is described in the preceding description solely in conjunction with replaceable battery or battery storage packs, the present invention relates in principle also to permanently installed rechargeable cells or battery cells. It is also within the meaning of the present invention to not limit the inventive concept to just known battery or rechargeable battery types. Instead, in principle any suitable energy storage technology is possible which may be used in conjunction with the inductive charging method described. In addition to visible light, basically any other suitable light radiation, such as infrared light (IR) or ultraviolet light (UV) is suitable for implementing the optical detection unit as well as the optocoupler.

What is claimed is:

1. A system for supplying an electric load, for charging a battery device, comprising:
   a charging station having a housing shaped to receive the battery device, the charging station including a detection unit for detecting that the battery device is received in the charging station, the detection unit having a first optical transmitting device for transmitting a first optical signal and an optical receiving device for receiving the first optical signal, the battery device being detected when the first optical signal is interrupted by at least a portion of the battery device being inserted into the charging station to occupy a space between the optical transmitting device and the optical receiving device;
   wherein the battery device includes a second optical transmitting device for transmitting a second and third optical signal, the second optical transmitting device functioning as a transmitter of a discretely configured optocoupler for transmitting information from the battery device to the charging station, and the optical receiving device of the charging station being configured as a receiver of the discretely configured optocoupler for receiving the second and third optical signals,
   wherein the charging station includes means for transmitting electrical energy to the battery device.

2. The system of claim 1, wherein the at least one portion of the battery device includes a conical housing part of a housing of the battery device, the second optical transmitting device being housed in the conical housing part so that when the battery device is inserted, the second optical transmitting device is situated in the field of view of the optical receiving device.

3. The system of claim 2, wherein the charging station includes a receiving shaft for the conical housing part of the battery device, in which the optical transmitting device and the optical receiving device of the charging station are situated opposite one another.

4. The system of claim 3, wherein the receiving shaft is configured as a continuous opening within the housing of the charging station.

5. The system of claim 1, wherein the means for transmitting electrical energy includes an inductive transmitter coil for transmitting energy in the form of a magnetic alternating field to an inductive receiver coil of the battery device, the charging station being configured to initiate the transmission of energy if the receipt of the first optical signal is interrupted over a predefined first time span, the charging station being further configured to stop the transmission of energy if over a predefined second time span no second optical signal is received and/or if the third optical signal is received.

6. The system of claim 1, wherein the battery device is configured to transmit with the aid of an optical pulse transmission protocol via the second optical transmitting device to the optical receiving device of the charging station identification-related information, information on the instantaneous state of charge or residual capacitance, on any malfunction and/or on instantaneous power requirements of the battery device.

7. A battery device for a system for supplying an electric load, for charging the battery device, the battery device being charged by a charging station that transmits a first optical signal via a first optical transmitting device, the battery device comprising:
   a second optical transmitting device for transmitting a second and third optical signal, the second optical transmitting device functioning as a transmitter of a discretely configured optocoupler for transmitting information from the battery device to the charging station, and an optical receiving device of the charging station being configured as a receiver of the discretely configured optocoupler for receiving the second and third optical signals;
   wherein the system includes the charging station having a housing shaped to receive at least a portion of the battery device, and a detection unit for detecting that the battery device is received in the charging station, the detection unit having the first optical transmitting device for transmitting the first optical signal and the optical receiving device for receiving the first optical signal,
   wherein the battery device is detected when the first optical signal is interrupted by at least a portion of the battery device being inserted into the charging station to occupy a space between the optical transmitting device and the optical receiving device, and
   wherein the charging station includes means for transmitting electrical energy to the battery device.

8. A supply station, which is a charging station for a system for supplying an electric load, for charging a battery device, comprising:
   a housing shaped to receive the battery device; and
   a detection unit for detecting that the battery device is received in the charging station, the detection unit having a first optical transmitting device for transmitting a first optical signal and an optical receiving device for receiving the first optical signal; and
   wherein the battery device includes a second optical transmitting device for transmitting a second and third optical signal, the second optical transmitting device functioning as a transmitter of a discretely configured optocoupler for transmitting information from the battery device to the charging station, and the optical receiving device of the charging station being configured as a receiver of the discretely configured optocoupler for receiving the second and third optical signals,
   wherein the battery device is detected when the first optical signal is interrupted by at least a portion of the battery device being inserted into the charging station to occupy a space between the optical transmitting device and the optical receiving device, and
   wherein the charging station includes means for transmitting electrical energy to the battery device.

9. A method for supplying an electrical load, for the inductive charging of a battery device, the method comprising:
   inserting the battery device into a housing of the charging station shaped to receive the battery device;
   detecting insertion of the battery device into the housing of the charging station with the aid of a detection unit made up of a first optical transmitting device which transmits a first optical signal and an optical receiving device which receives the first optical signal, wherein the battery device is detected when the first optical signal is interrupted by at least a portion of the battery device being inserted into the charging station to occupy a space between the optical transmitting device and the optical receiving device;
   initiating a transmission of energy from an inductive transmitter coil of the charging station to an inductive receiver coil of the battery device if over a predefined time period the transmission of the first optical signal is interrupted;
   initiating the charging operation if within the second time span the optical receiving device receives a second optical signal from a second optical transmitting device of the battery device; and
   stopping the charging operation if the optical receiving device receives a third optical signal from the second optical transmitting device.

10. The method of claim 9, wherein the energy transmission is stopped again if after expiration of the second time span the optical receiving device has received no second optical signal from a second optical transmitting device of the battery device.

11. The method of claim 9, wherein the charging operation is stopped if after removal of the battery device the optical receiving device again receives the first optical signal.

12. The method of claim 9, wherein the charging operation is restarted if, upon insertion of the battery device, the transmission of the third optical signal from the second optical transmitting device to the optical receiving device is interrupted over a time period which corresponds at least to the first time span.

* * * * *